Dec. 25, 1934.   H. B. HOEFER   1,985,541
PIPE CUTTER
Filed May 18, 1933   4 Sheets-Sheet 1

INVENTOR.
Harrison B. Hoefer
BY
ATTORNEY.

Dec. 25, 1934.  H. B. HOEFER  1,985,541
PIPE CUTTER
Filed May 18, 1933  4 Sheets-Sheet 2

INVENTOR.
Harrison B. Hoefer
BY
ATTORNEY.

Dec. 25, 1934.  H. B. HOEFER  1,985,541
PIPE CUTTER
Filed May 18, 1933  4 Sheets-Sheet 3

INVENTOR.
Harrison B. Hoefer
BY Ralph W. Brown
ATTORNEY.

Dec. 25, 1934.  H. B. HOEFER  1,985,541
PIPE CUTTER
Filed May 18, 1933  4 Sheets—Sheet 4
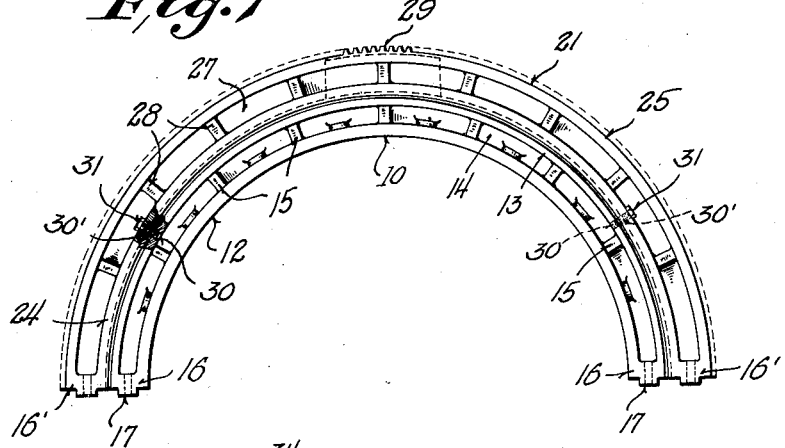
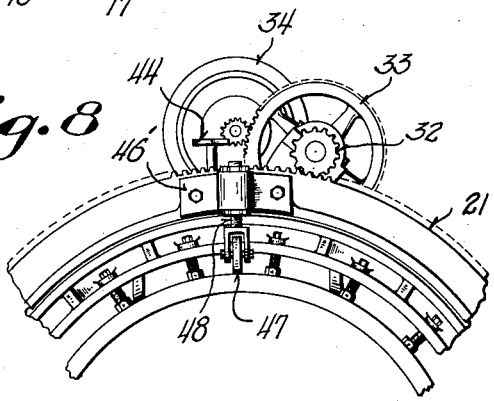
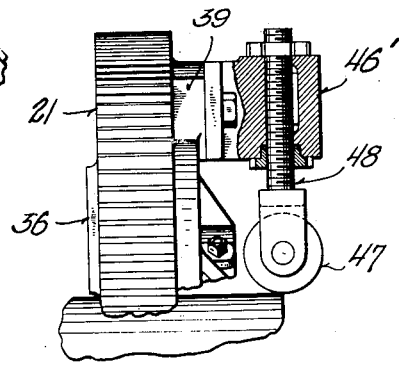
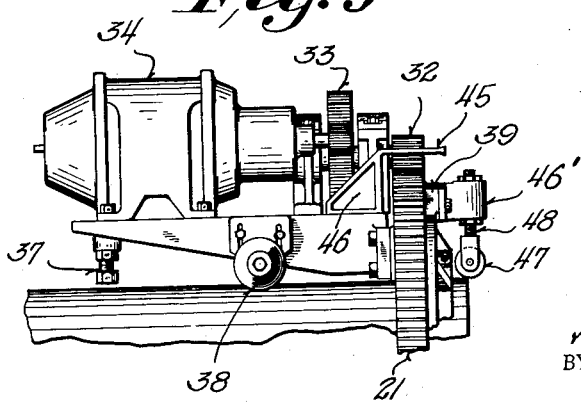
INVENTOR.
Harrison B. Hoefer
BY
Ralph W. Brown.
ATTORNEY.

Patented Dec. 25, 1934

1,985,541

UNITED STATES PATENT OFFICE 1,985,541

PIPE CUTTER

Harrison B. Hoefer, Milwaukee, Wis.

Application May 18, 1933, Serial No. 671,604

9 Claims. (Cl. 164—60)

This invention relates to portable power driven pipe cutters for the cutting and grooving of large heavy pipe.

The pipe cutter of the present invention may be advantageously employed in the laying or relaying of municipal water mains and has particular utility in the cutting and removal of portions of previously laid heavy pipe.

Methods heretofore employed in cutting large pipe to length in the field or in the trench have involved either the use of a hammer and chisel or a torch. The chisel method is not entirely satisfactory because of the danger of weakening the metal of the pipe as a result of the hammer blows, because the pipe does not always part along the line of the cut, causing waste, and because of the time consuming effort involved. Nor is the torch method satisfactory because of invisible hair cracks which are thereby produced in the metal and which are always a potential danger, in that after burying the pipe under ground and subjecting it to normal service conditions the cracks thus formed not infrequently develop into ruptures or leaks.

An object of the present invention is the provision of an improved portable power driven pipe cutting machine by which large heavy pipe may be readily cut in the field in such manner as to eliminate the serious objections to methods heretofore practiced.

The machine of the present invention is well adapted for cutting large pipe within the narrow confines of a trench in which it is laid. The cutting tools employed therein are preferably such as to remove a narrow strip of metal from the pipe and for that reason the machine is particularly well adapted for removing short sections of previously laid pipe, removal of the severed section being greatly facilitated by the clearance afforded by the metal thus removed.

Another object is the provision in a portable machine for cutting large pipe of mounting means therefor by which the machine may be more readily shifted into any desired position along the pipe. This feature is of great importance, particularly, when, after cutting the pipe, it is desired to cut a groove in the remaining portion thereof spaced from the plane of the cut. Such a groove may be advantageously employed to effect a secure joint with an adjacent pipe section, in the event that the ordinary joint-forming end of the pipe has been cut off.

Other objects and advantages of the present invention will appear from the following description of an illustrative embodiment thereof.

In the accompanying drawings:—

Fig. 7 is a rear elevation, partly in section, of the assembled halves of the clamp and tool carrier rings shown in Fig. 2.

Fig. 8 is a fragmentary front elevation of the machine equipped with special mounting means for travel along the pipe.

Fig. 9 is a side elevation of the mechanism shown in Fig. 8.

Fig. 10 is an enlarged view, partly in section, of a portion of the mechanism shown in Fig. 9.

Figure 1:
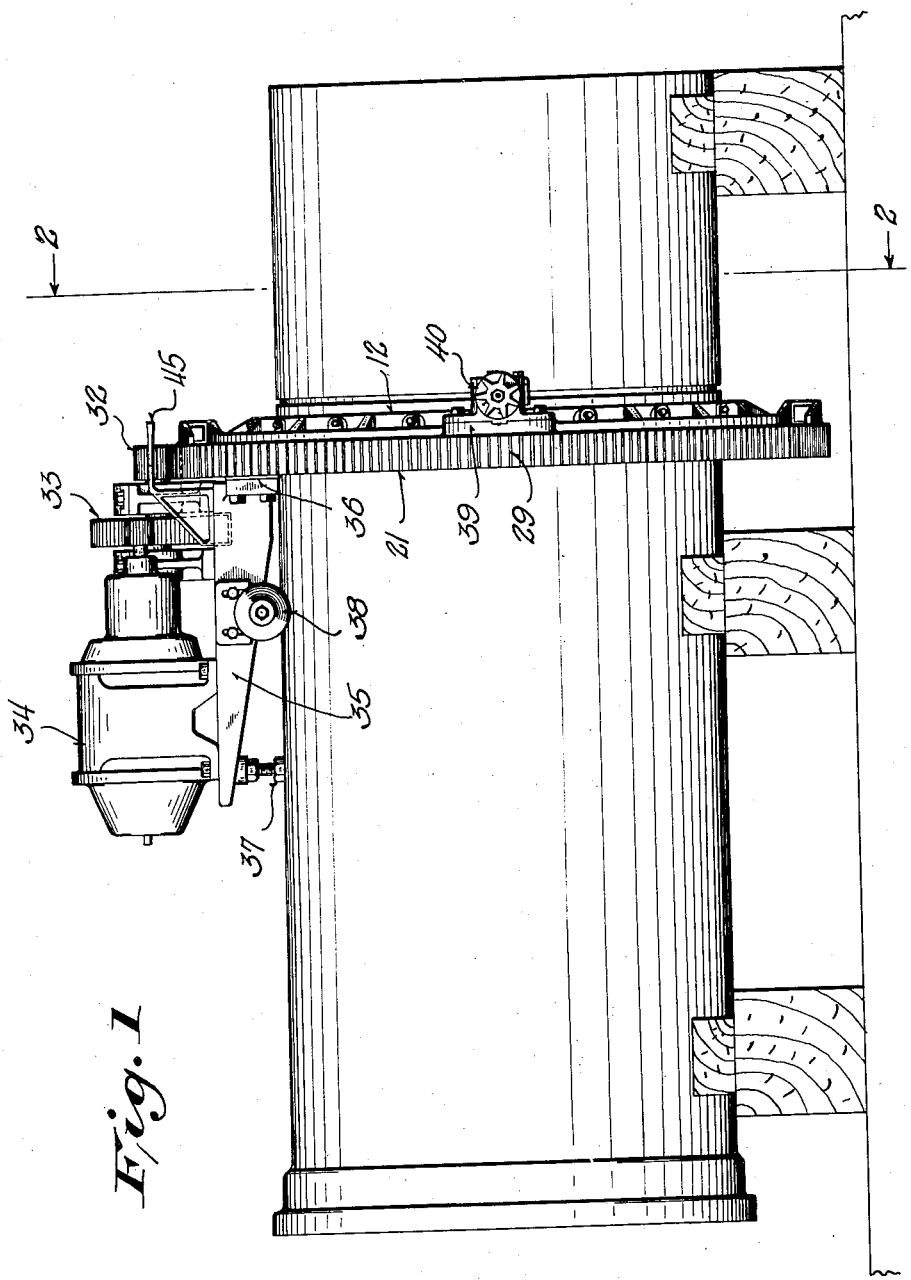
Figure 1 is a side elevation of a portable pipe cutting machine constructed in accordance with the present invention, and showing the same applied to a standard pipe section.
Figure 2:
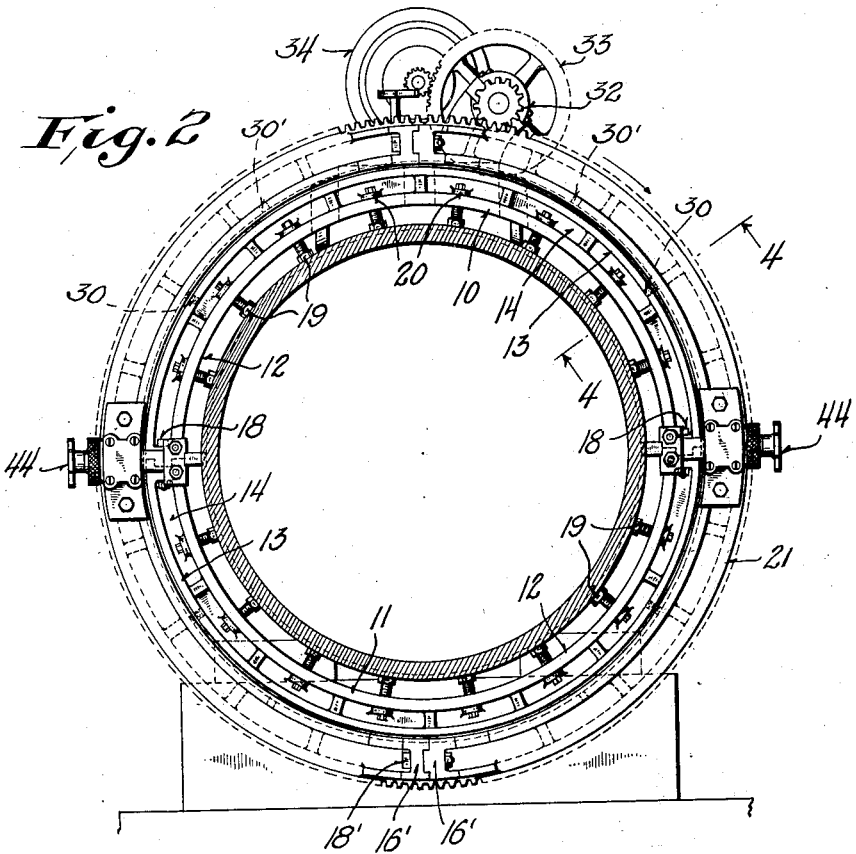
Fig. 2 is a transverse sectional view, taken on the line 2—2 of Fig. 1, and showing the machine in front elevation.
Figure 3:
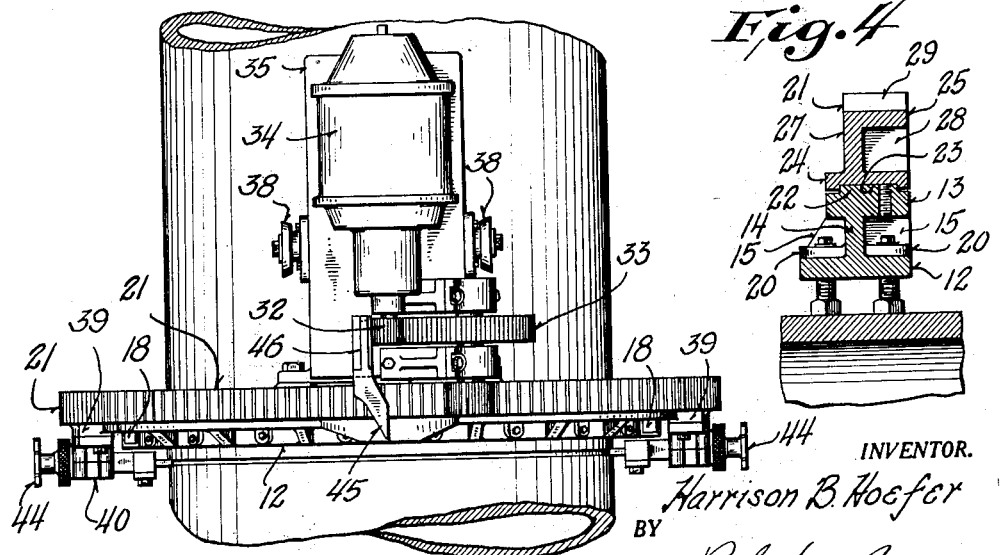
Fig. 3 is a top plan view.

The pipe cutting machine selected for illustration comprises a two-part clamp ring which is split along a diameter to form an upper half 10 and a separable lower half 11. Each half of the ring includes a relatively wide inner flange 12, and an outer flange 13 rigidly connected to the inner flange 12 through an intermediate web 14 and brace ribs 15, the ends of the flanges being additionally connected through end heads 16. The end heads 16 of the upper half of the ring are machined to form locking lugs 17 adapted for snug engagement within mating recesses in the end heads of the lower half, the mating end heads being rigidly, but releasably, united by pairs of bolts 18 disposed at opposite sides of the intermediate web 14.

The assembled clamp ring is releasably fixed to and accurately centered upon the section of pipe to be cut by two spaced series of clamp screws 19 threaded through the inner flange 12, at opposite sides of the web 14, and through re-enforcing lugs 20 formed on the web. When applied to the largest size or the larger sizes of pipe the screws 19 bear against the pipe, and when applied to smaller sizes pipe-spacer blocks are ordinarily employed, one block being interposed between the pipe and each pair of adjacent screws.

Figure 4:
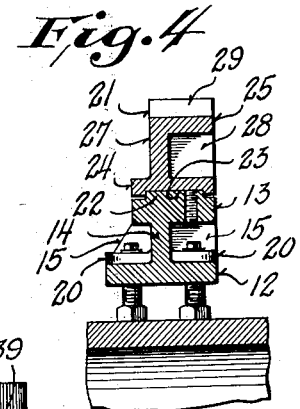
Fig. 4 is a sectional detail view on a larger scale, taken along the line 4—4 of Fig. 2.
Figure 5:
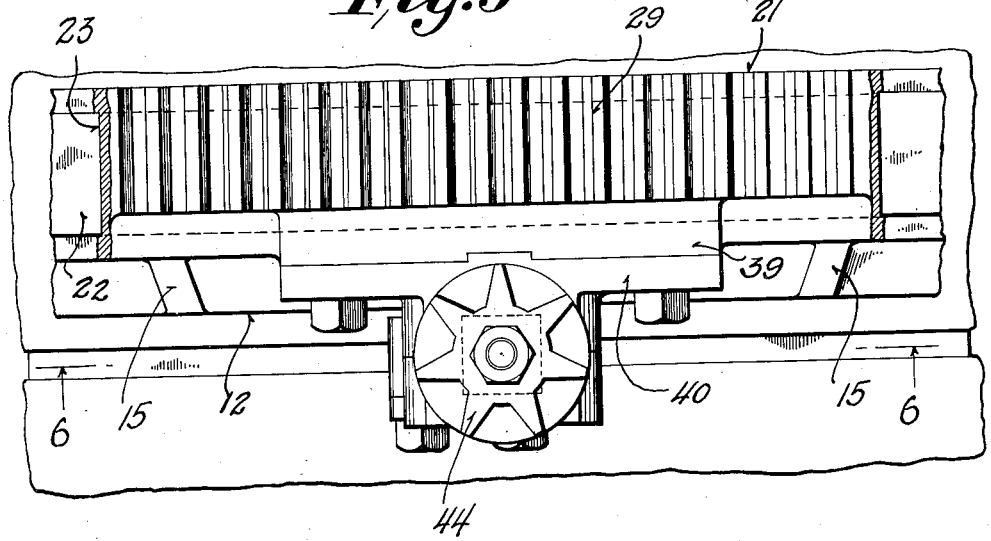
Fig. 5 is a fragmentary plan view on a larger scale, showing a tool carriage in plan.

The clamp ring serves as a support and guide for a tool carrying ring gear 21, and for that purpose the outer flange 13 of the clamp ring is machined to form a rib 22 (Fig. 4) having a close sliding fit with a channel 23 formed in the internal flange 24 of the ring gear.

The ring gear 21 has an outer flange 25 rigidly connected to the inner flange 24 through an intermediate web 27 and braced by transverse webs 28. The outer flange 25 carries a series of gear teeth 29 through which the ring gear is driven. Like the clamp ring, the ring gear comprises two separable halves whose ends 16' are finished in a similar manner and releasably united through pairs of bolts 18' disposed at opposite sides of the web 27.

To facilitate mounting and removal of the clamp ring and ring gear onto and from a pipe, provision is preferably made for releasably locking them together with the joints between the halves of one adjacent the corresponding joints of the other, as illustrated in Fig. 7. In this instance the outer flange 13 of the clamp ring and the inner flange 24 of the ring gear are drilled and tapped, as at 30 and 30', to receive locking screws 31 when in the position of Fig. 7. When so secured together, each half of the clamp ring together with a corresponding half of the ring gear may be handled as a single unit. The screws 31 are of course omitted during operation of the machine.

The ring gear 21 is driven by a pinion 32 forming a part of an appropriate speed reduction gear train 33 through which power is transmitted from an electric motor 34 or other power source. The motor 34 and gear train 33 are mounted upon a suitable bracket 35 bolted or otherwise fixed to a pad 36 formed on the clamp ring.

The rear end of the motor bracket 35 is preferably provided with a jack screw 37 which may be adjusted to bear against the pipe to thereby partially support and steady the bracket during operation. The motor bracket is also partially supported by a pair of rollers 38 disposed intermediate the ends thereof and resting on the pipe.

Figure 6:
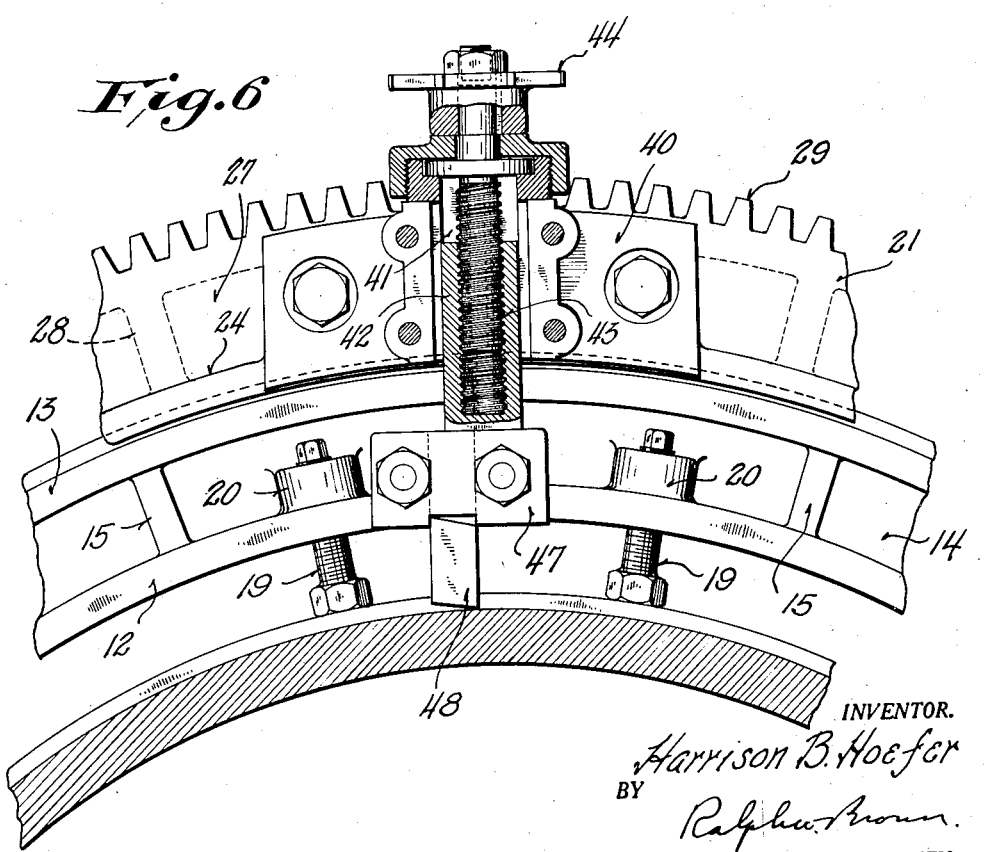
Fig. 6 is a sectional view taken along the line 6—6 of Fig. 5.

At diametrically opposite points on the front of the ring gear 21 appropriate pads 39 are formed to receive suitable tool carriers 40 (Fig. 6) which are bolted or otherwise removably fixed thereto. In this instance each tool carrier is provided with a square guide hole 41 in which a square tool post 42 is guided for lengthwise adjustment radially of the ring gear. Adjustment of each tool post is effected by a non-rising feed screw 43 threaded into the post and journalled in the tool carrier. In this instance, each feed screw 43 is automatically actuated by a star wheel 44 fixed thereto and arranged to engage a stationary stop finger 45 upon each revolution of the ring gear. The stop finger 45 projects into the path of travel of the star wheels 44 from an appropriate support 46 carried by the motor bracket. Each tool post is equipped with a suitable clamp 47 by which each tool 48 is securely supported.

The arrangement is such that as the ring gear 21 is driven by the motor 34, about the clamp ring, the tools 48 travel about the pipe, and, upon each revolution, each tool is automatically fed toward the pipe a predetermined increment by each partial rotation imparted to its star wheel 44 and feed screw 43 as each star wheel prong engages and passes the stop 45.

It will be noted that the tools 48 are disposed quite close to the series of clamp screws 19 so that the screws are in position to sustain the cutting load to best advantage. This is brought about by mounting the ring gear 21 on the periphery of the clamp ring and substantially within the planes thereof.

To remove the machine from the pipe, the ring gear 21 is rotated until one half thereof registers with the upper half of the clamp ring, and when the holes 30' mesh with holes 30 the screws 31 are inserted so as to secure each half of the ring gear to one of the clamp ring halves. All the bolts 18 and 18' are then released so as to separate the lower halves from the upper halves, and the upper halves together with the attached motor bracket etc. are lifted from the pipe.

To shift the machine along the pipe, the ring gear 21 is first rotated so as to position one of the tool carrier pads 39 centrally above the pipe. The tool carrier 40 thereon is then removed and replaced by a block 46' having a roller 47 mounted thereon. (See Figs. 8 to 10.) In this instance the roller 47 is carried by a vertical stem 48 lengthwise adjustable in the block 46. The stem 48 is then adjusted so as to force the roller 47 against the top of the pipe. The jack screw 37 on the rear end of the motor bracket 35 is then backed away from the pipe and the several clamp screws 19 are released, so that the motor bracket, clamp ring, and ring gear are then supported by the three rollers 38 and 47. The machine may then be readily shifted to any desired position along the pipe.

After a section of the pipe has been cut off, the machine may be shifted away from the plane of the cut and operated to cut a groove only in the pipe at a short distance from the remaining end thereof. A groove thus cut may be advantageously employed to effect a secure joint with an adjacent pipe.

Various changes may be made in the embodiment of the invention hereinabove described without departing from or sacrificing the advantages of the invention as defined in the appended claims.

I claim:—

1. A portable pipe cutting machine comprising a clamp ring for mounting on a pipe, two circular series of clamp screws projecting inwardly from said ring to secure and center the same on the pipe, a motor bracket attached to said ring and extended laterally from one side thereof, pipe engaging rollers on said bracket for supporting the same, a ring gear rotatably mounted on and guided by the external periphery of said ring, a pipe cutting tool carried by said ring gear for travel therewith about the pipe, and a motor on said bracket operably connected with said ring gear to drive the same.

2. A portable pipe cutting machine comprising a ring having means for securing and centering the same on a pipe to be cut, a motor bracket attached to said ring and extended laterally from one side thereof, said bracket having pipe engaging means for supporting the same, a ring gear rotatably mounted on and guided by said ring, a pipe cutting tool carried by said ring gear for travel therewith about the pipe, and a motor on said bracket operably connected with said ring gear to drive the same.

3. A portable pipe cutting machine comprising a ring having means for securing and centering the same on a pipe to be cut, a motor bracket attached at one end to said ring, a pair of pipe engaging rollers on said bracket to support the same, a jack screw at the other end of said bracket for supporting engagement with the pipe, a ring gear rotatably mounted on and guided by said ring, a pipe cutting tool carried by said ring gear for travel therewith about the pipe, and a motor on said bracket connected with said ring gear to drive the same.

4. A portable pipe cutting machine comprising a ring having means for securing and clamping the same onto a pipe to be cut, a motor bracket attached to said ring, supporting rollers on said bracket engaging the pipe, a ring gear rotatably mounted on and guided by said ring for carrying a pipe cutting tool about the pipe, a motor on said bracket connected with said ring gear to drive the same, and means for mounting a pipe engaging roller on said ring gear for cooperation with said first named rollers to form a roller support for the entire machine to facilitate travel thereof along the pipe.

5. A portable pipe cutting machine comprising a ring having means for securing and clamping the same upon a pipe to be cut, a motor bracket attached to said ring, pipe engaging rollers on said bracket to support the same, a ring gear rotatably mounted on and guided by said ring, a motor on said bracket for driving said ring gear, and means on said ring gear adapted to receive and carry a cutting tool therewith about the pipe when the ring gear is rotated or to receive a pipe engaging supporting roller for cooperation with said first named rollers to facilitate travel of the entire machine along the pipe.

6. A portable pipe cutting machine comprising a clamp ring having inner and outer flanges connected by an intermediate web, two spaced circular series of pipe clamping screws projecting inwardly from said inner flange at opposite sides of said web, a motor driven ring gear rotatably mounted on and guided by said outer flange, and a cutter carrier secured to the side of said ring gear for travel therewith about the pipe.

7. A portable pipe cutting machine comprising a clamp ring having inner and outer flanges connected by an intermediate web, two spaced circular series of pipe clamping screws projecting inwardly from said inner flange at opposite sides of said web, a motor bracket attached to said ring and having pipe engaging means for supporting the same, a ring gear rotatably mounted on and guided by said outer flange, a cutter carrier secured to the side of said ring gear for travel therewith about the pipe, a motor on said bracket for driving said ring gear, and means for automatically feeding the cutter toward the pipe, said means including a star wheel on said carrier, and a stop on said bracket projecting into the path of travel of said star wheel to rotate the same during each revolution of said ring gear about the pipe.

8. A portable pipe cutting machine comprising a two-part clamp ring having inner and outer flanges connected by an intermediate web, said ring being split along a diameter into separable halves, end heads at the opposite ends of each of said halves adapted to abut the mating end heads of the other half, each end head of each half being shaped to interlock with the mating end head of the other half, bolts extending through each mating pair of end heads to releasably secure said halves together, means for centering and securing said clamp ring to a pipe to be cut, a two-part ring gear rotatably mounted on and guided by said outer flange of said clamp ring, a pipe cutting tool carried by said ring gear for travel therewith about the pipe, and means attached to said clamp ring for driving said ring gear.

9. A portable pipe cutting machine comprising a two-part clamp ring split along a diameter into separable halves, means for releasably securing the ends of said halves together, means for centering and securing said clamp ring to a pipe to be cut, a two-part ring gear rotatably mounted on and guided by said clamp ring, said ring gear being split along a diameter into separable halves, means for releasably securing the ends of said last named halves together, a pipe cutting tool carried by said ring gear, means for driving said ring gear, and means for releasably locking each of said ring gear halves to one of said clamp ring halves with the ends of the former adjacent the ends of the latter to thereby facilitate application and removal thereof to and from the pipe.

HARRISON B. HOEFER.